United States Patent
Eldridge et al.

(10) Patent No.: US 8,195,959 B2
(45) Date of Patent: Jun. 5, 2012

(54) ENCRYPTING A CREDENTIAL STORE WITH A LOCKBOX

(75) Inventors: Alan D. Eldridge, Hollis, NH (US); David S. Kern, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 2302 days.

(21) Appl. No.: 10/995,004

(22) Filed: Nov. 22, 2004

(65) Prior Publication Data

US 2006/0112283 A1    May 25, 2006

(51) Int. Cl.
   *G06F 12/14*    (2006.01)
(52) U.S. Cl. .................................... 713/193; 380/286
(58) Field of Classification Search .................. 713/193; 380/286
   See application file for complete search history.

(56) References Cited

U.S. PATENT DOCUMENTS

| 5,623,637 | A * | 4/1997 | Jones et al. | 711/164 |
| 6,389,535 | B1 * | 5/2002 | Thomlinson et al. | 713/165 |
| 6,754,349 | B1 * | 6/2004 | Arthan | 380/286 |
| 6,754,827 | B1 * | 6/2004 | Cane et al. | 713/193 |
| 6,941,464 | B1 * | 9/2005 | Barton et al. | 713/193 |
| 6,950,522 | B1 * | 9/2005 | Mitchell et al. | 380/280 |
| 7,206,847 | B1 * | 4/2007 | Alberth et al. | 709/229 |
| 2005/0129246 | A1 * | 6/2005 | Gearhart | 380/278 |

* cited by examiner

*Primary Examiner* — Kambiz Zand
*Assistant Examiner* — Amare F Tabor
(74) *Attorney, Agent, or Firm* — Steven M. Greenberg, Esq.; Carey, Rodriguez, Greenberg & O'Keefe

(57) ABSTRACT

The present invention is a method, system and apparatus for the encryption of a credential store by using a lockbox mechanism. In a credential store encryption method, a lockbox for a credential store can be retrieved and an encryption key can be selected from among a list of encryption keys in the lockbox. The lockbox can be a local lockbox and the local lockbox can be retrieved from an unencrypted region of the credential store. In any case, subsequent to the retrieval of the lockbox, the credential store can be decrypted with the selected encryption key.

10 Claims, 4 Drawing Sheets

ENCRYPTING A CREDENTIAL STORE WITH A LOCKBOX

BACKGROUND OF THE INVENTION

1. Statement of the Technical Field

The present invention relates to the security of confidential information, and more particularly to the security of a credential store with a lockbox.

2. Description of the Related Art

Security of confidential information remains a vital concern for any entity that stores sensitive information or transmits it across both secure and insecure networks alike. Many systems employ a credential store to identify and authenticate specific users of a system and control that specific user's access to certain applications, files and other sensitive data.

One way to secure confidential information, such as credential files, is through cryptography. The purpose of cryptography is to make data storage and transmission secure. Security is achieved by means of encryption, that is, converting a clear-text message (plain text) into a data stream that looks like a meaningless and random sequence of bits (cipher text). A cryptographic algorithm, also known as cipher, is a mathematical function that uses plain text as the input and produces cipher text as the output (and vice versa). All modern ciphers use keys together with plain text as the input to produce cipher text. A key is a value that works with a cryptographic algorithm to produce a specific cipher text. The same or a different key is supplied to the decryption function to recover plain text from cipher text.

There are a number of techniques used to encrypt and decrypt credential stores with passwords. The most common approach for symmetric encryption involves the one-way hashing of a known password (possibly with or without a "salt"). In general, hashing is the process of producing hash values for accessing data or for security. A hash value (or simply hash), also called a message digest, is a number of a fixed length that is generated from a string of text of arbitrary length. Typically, the hash is substantially smaller than the text itself. A "salted" hash can add greater security to a credential store by attaching a random value—the so called salt—to each password and only then computing the hash over the password and salt.

As mentioned above, credential store security and confidentially are normally provided through the use of cryptology, where an encryption key is derived from a password via a Password Based Key Derivation Function (PBKDF). In some environments, the same password is also used for other purposes, such as authentication to other services unrelated to the credential store, and a mechanism can be used to synchronize all of these disparate passwords with a single value.

Unfortunately, if a system administrator changes the "master" password and tells that password to the user, the user will be unable to access his credential store with the new password, since the credential store is still encrypted using a key derived from the old password. A common practice today is to prompt the user to enter the old password, but this level of user interaction is unacceptable in some environments.

SUMMARY OF THE INVENTION

The present invention addresses the deficiencies of the art in respect to credential store confidentially and provides a non-obvious method, system and apparatus for the encryption of a credential store by using a container having a set of encryption keys capable of decrypting the credential store, referred to herein as a lockbox. In a credential store encryption method, a lockbox for a credential store can be retrieved and an encryption key can be selected from among a list of encryption keys in the lockbox. The lockbox can be a local lockbox and the local lockbox can be retrieved from an unencrypted region of the credential store. In any case, subsequent to the retrieval of the lockbox, the credential store can be decrypted with the selected encryption key.

In a first aspect of the invention, the method further can include retrieving a global lockbox for the credential store. If the selected encryption key cannot decrypt the credential store, an encryption key can be otherwise selected from the global lockbox to decrypt the credential store. In any case, first a decryption can be attempted using an encryption key derived from a system wide password. Subsequently, the retrieving, selecting and decrypting steps can be performed if the derived encryption key does not decrypt the credential store. Moreover, the local lockbox can be replaced with the global lockbox and the credential store can be re-encrypted if the selected encryption key cannot decrypt the credential store.

A system for credential store security can include a credential store and a local lockbox disposed in an unencrypted portion of the credential store. The local lockbox can include a list of encryption keys for decrypting the credential store. Finally, the system can include recovery logic configured to decrypt the credential store using an encryption key selected from among the encryption keys in the list in the local lockbox. In an optional embodiment, a global lockbox can be remotely disposed and can include a list of encryption keys for decrypting the credential store.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for providing security to a confidential credential store by encrypting the confidential information using a key derived from a password that is stored in a lockbox. In accordance with the present invention, a lockbox can be formed to include a list of encrypted password keys, which can be used to process a credential store. The encrypted lockbox can be stored in an unencrypted region of a credential store file. Additionally, a global version of the encrypted lockbox can be stored on system data storage such as a server. Recovery logic can be used to access the credential store and retrieve the local lockbox and/or the global lockbox for obtaining the keys used to encrypt the credential store. Through processing the lockbox, the key used to encrypt the credential store can be retrieved and used to provide access to the credential store.

Figure 1:
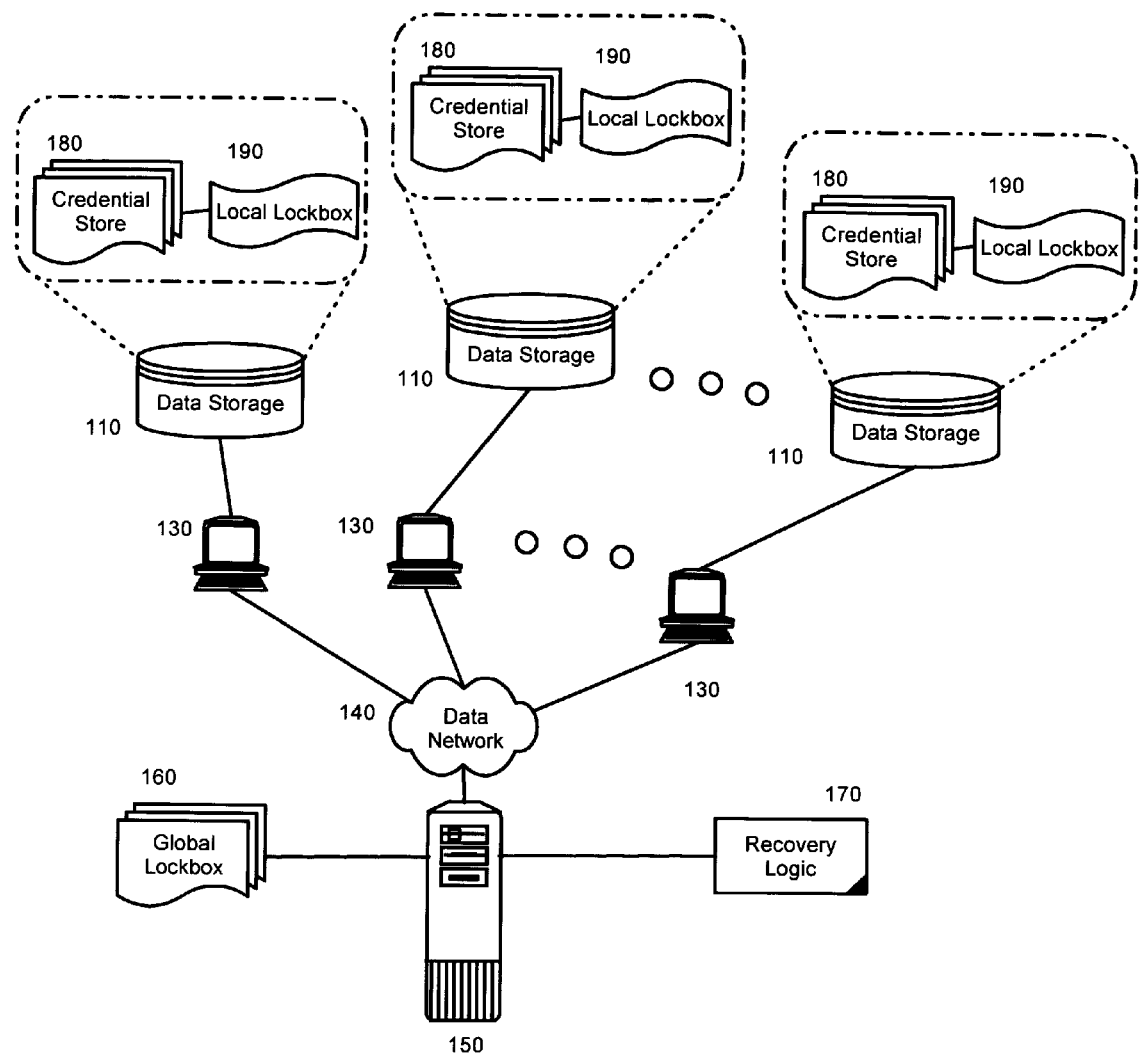
FIG. 1 is a schematic illustration of a system, method and apparatus for protecting confidential credential information of clients through the use of a lockbox.

In further illustration, FIG. 1 schematically depicts a credential store system that has been configured in accordance with a preferred aspect of the inventive arrangements. The system can include a server 150 that can be coupled to one or more client servers 130 over a data network 140. The server 150 can host recovery logic 170. The recovery logic 170 can be communicatively linked to a local data store 110. Likewise, the recovery logic 170 also can be communicatively linked to a global data store 160.

Importantly, the recovery logic 170 can retrieve and manipulate local lockboxes 190 and a global lockbox 160 to obtain the correct credential store cryptographic key (CSCK) to access and decrypt the credential store 180. In this way, and unlike conventional credential store security systems that require a user to input a password to access and use the credential store, the system of the invention provides a method where the CSCK can be obtained automatically via a lockbox (190 or 160) to access and otherwise manipulate a user's credential store.

Figure 2:
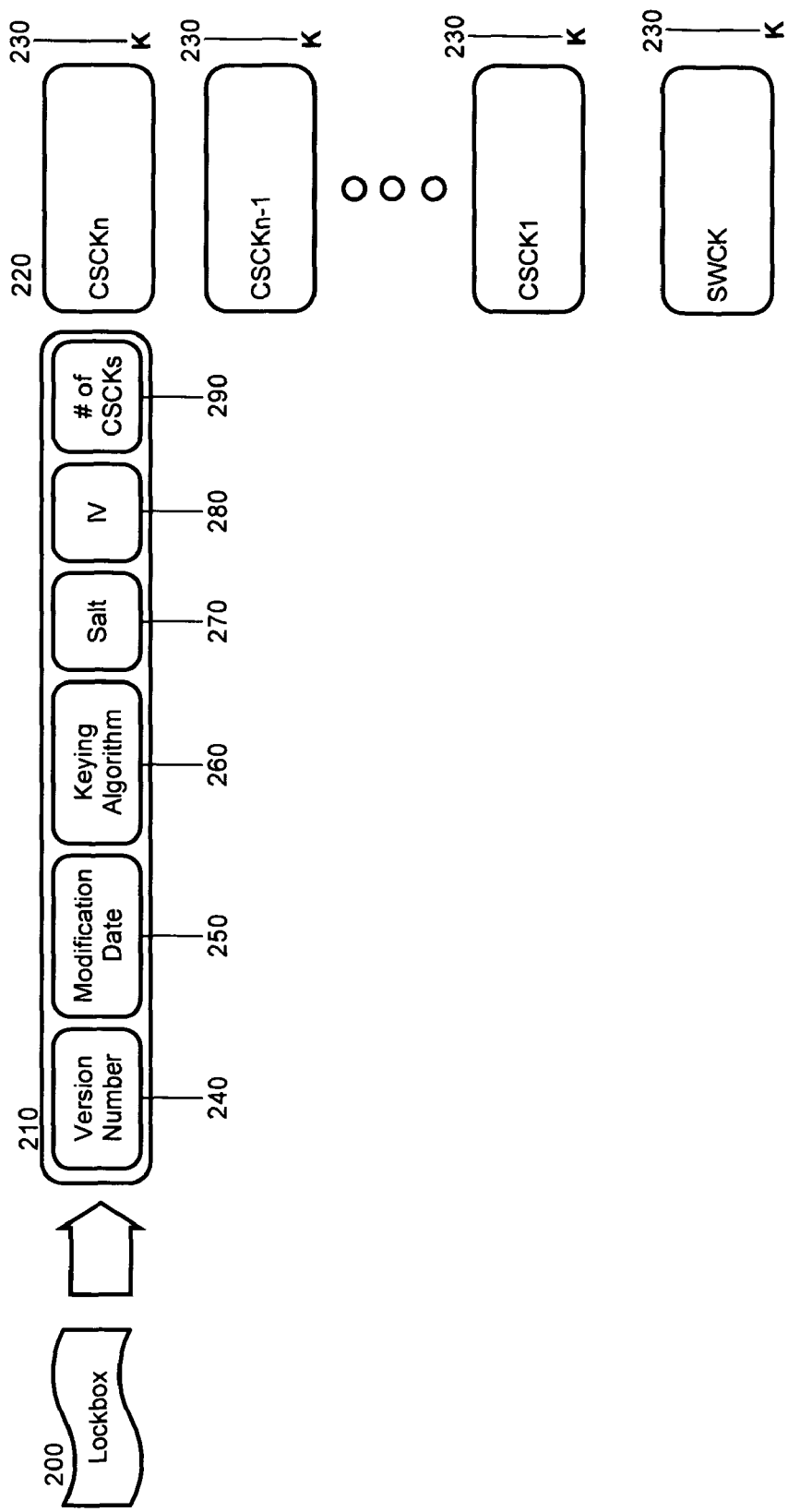
FIG. 2 is a pictorial illustration the composition of exemplary lockboxes configured for use in the system of FIG. 1; and, FIGS. 3A and 3B, taken together, are a flow chart illustrating a process for encrypting a credential store with a lockbox in the system of FIG. 1.

Referring to FIG. 2, a lockbox 200 can include an unencrypted header 210, and a list of "old" encrypted hashed passwords (CSCK1 through CSCKn), where an individual encryption key 230 was used to encrypt each hashed password. The lockbox 200 yet further can include a hash of the most current system wide password that has been encrypted according to an encryption key 230 derived from the current password (SWCK). The unencrypted header 210 can include a version number 240, a modification date 250, a keying algorithm 260, a "salt" 270, an initialization vector (IV) 280 and the number of CSCKs 290 in the list of "old" hashed passwords 220, all of which can be processed by the recovery logic to access and decrypt a credential store.

Figure 3A:
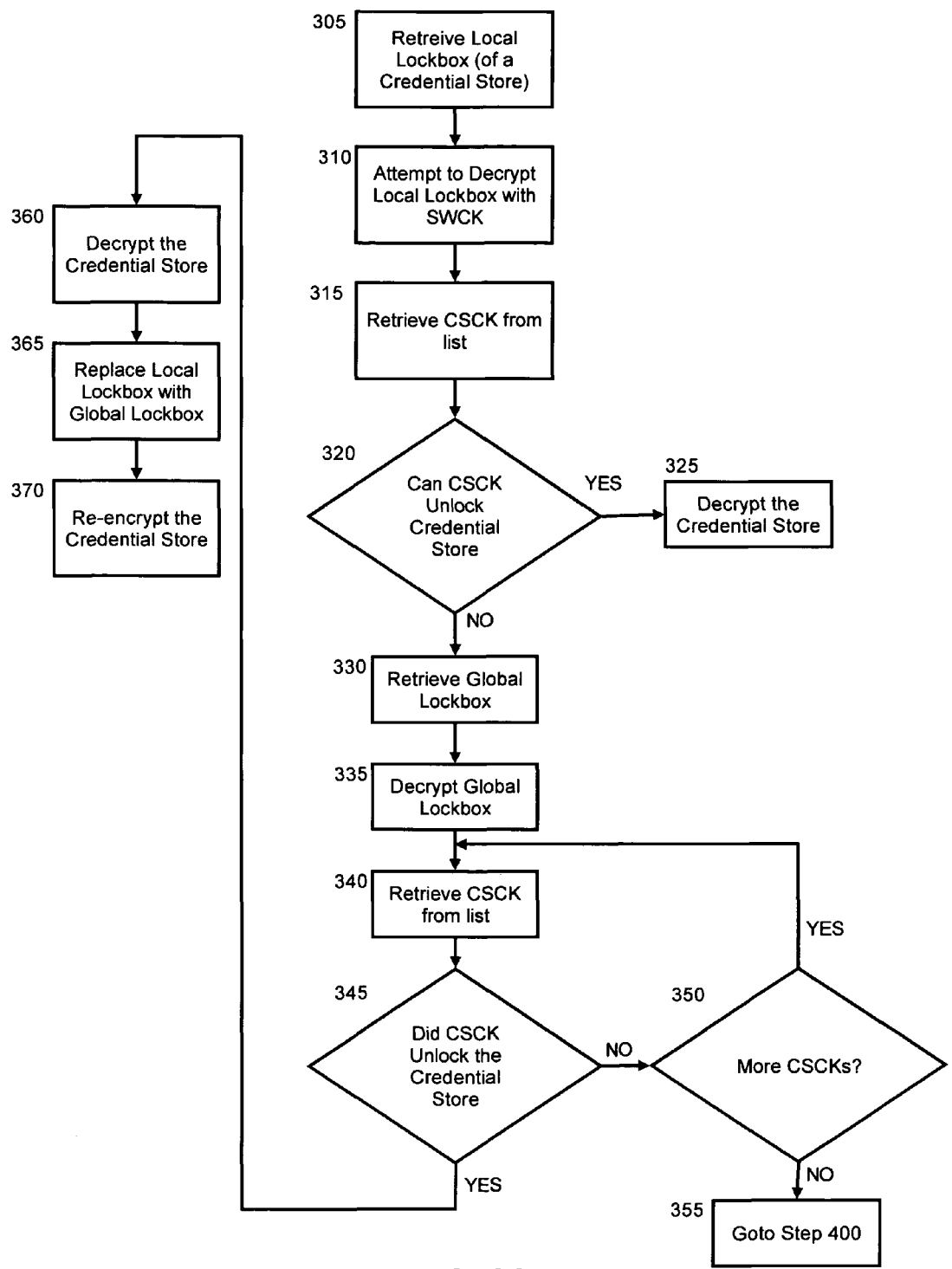
Figure 3B:
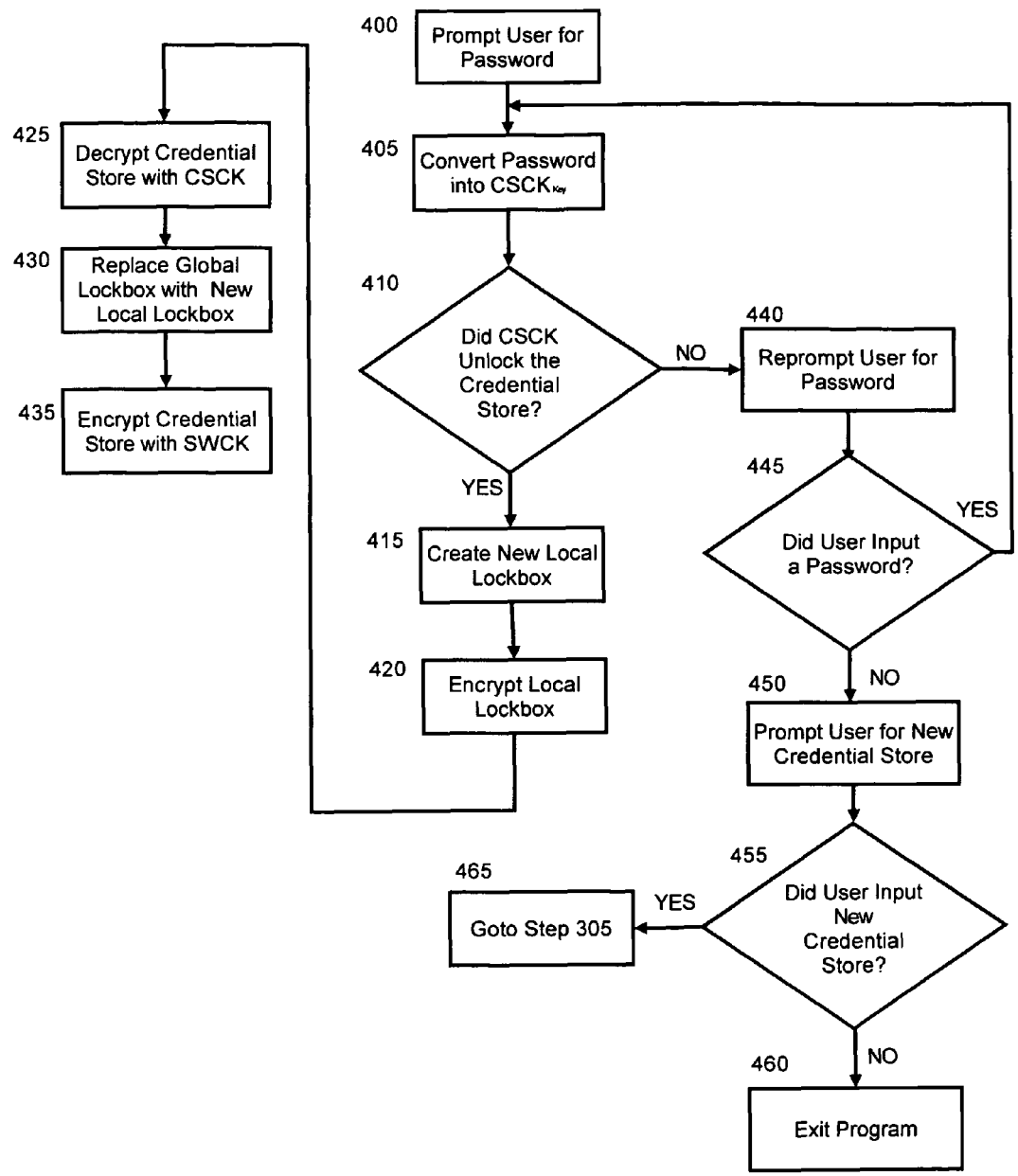

Notably, the global lockbox corresponding to a credential store can be processed when either the user or the administrator changes the user's password. The processing of the global lockbox can include the decryption of the lockbox using a key (CSCK) derived from the prior password, the addition of a hash of the new password, and the re-encryption of the lockbox using a key (SWCK) derived from the current password. In more particular illustration of the process of the invention, FIGS. 3A and 3B, taken together, are a flow chart illustrating the encryption of a credential store with a lockbox in the system of FIG. 1.

Beginning in block 305, access to a credential store can be initiated and the local lockbox can be retrieved for the credential store. In block 310, an attempt to decrypt the local lockbox using the current password (SWCK) can be performed. In block 315, the most recent CSCK can be retrieved from the list of CSCKs and the retrieved CSCK can be used in an attempt to unlock the credential store. If in decision block 320, it is determined that the most recent CSCK matches the SWCK, then the credential store can be decrypted. Otherwise, the global lockbox can be retrieved and decrypted as indicated in blocks 330 and 335.

In block 340, the most recent CSCK can be retrieved from the list of CSCKs in the global lockbox, and the retrieved CSCK can be used in an attempt to unlock the credential store. If in decision block 345, it is determined the most recent CSCK unlocks the credential store, then the credential store can be decrypted in block 360. Once the credential store has been decrypted, in block 365, the local lockbox can be replaced with the global lockbox and the credential store can be re-encrypted using the SWCK.

On the other hand, if in decision block 345, it is determined that the most recent CSCK fails to unlock the credential store, then in decision block 350, the global lockbox can be queried to determine if any there are remaining CSCKs in the list that have not been used in an attempt to unlock the credential store. If there is a remaining CSCK in the list, then the remaining CSCK can be retrieved, as in block 340, and used in an attempt to unlock in the credential store as in block 345. In contrast, if it is determined in decision block 350 that each of the CSCKs in the list have been used, then as in block 355, the process can continue to block 400, where the user can be prompted for a password.

In block 405, the password can be received and converted into a CSCK Encryption key. If in decision block 410, it is determined the newly converted CSCK unlocks the credential store, then a new local lockbox can be created in block 415, a new local lockbox can be encrypted in block 420, the credential store can be decrypted in block 425, the global lockbox can be replaced with the local lockbox and the credential store can be encrypted with the SWCK, as in block 435.

If in decision block 410, it is determined that the CSCK did not unlock the credential store, then in block 440, the user can be reprompted for another password. If in decision block 445, it is determined that the user provided another password, that password converted into a CSCK, as in block 405, and an attempt to unlock the credential store can be evaluated in decision block 410. As mentioned previously, if in decision block 410, it is determined the newly converted CSCK unlocks the credential store, then a new local lockbox is created in block 415, that new local lockbox can be encrypted in block 420, the credential store can be decrypted in block 425, the global lockbox can be replaced with the local lockbox and the credential store can be encrypted with the SWCK, as in block 435. Otherwise, as in block 440, the user is reprompted again for a password.

If, in decision block 445, the user fails to enter a password, then in block 450, the user is prompted to enter a new credential store. If the user fails to enter a new credential store, then the user will be forced to exit the program or application, as in decision block 445. If the user did enter a new credential store, then, in block 465, the process will continue in block 305, where the local lockbox of the new credential store is retrieved. This process can then continue as previously described until the user decides to exit the system.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A credential store security method comprising the steps of:
   retrieving a local lockbox for a credential store;
   selecting an encryption key from among a list of encryption keys in said lockbox;
   decrypting said credential store with said selected encryption key;
   retrieving a global lockbox for said credential store; and,
   if said selected encryption key cannot decrypt said credential store, selecting an encryption key from said global lockbox to decrypt said credential store.

2. The method of claim 1, further comprising the step of replacing said local lockbox with said global lockbox and re-encrypting said credential store if said selected encryption key cannot decrypt said credential store.

3. The method of claim 1, wherein said first attempting step comprises the steps of:
   prompting the user for a password;
   receiving said password; and,
   attempting to unlock said credential store with a key derived from said password.

4. The method of claim 3, further comprising the steps of:
   creating a new local lockbox;
   encrypting said new local lockbox;
   replacing a global lockbox with said new local lockbox; and,
   encrypting said credential store with said key derived from said password.

5. The method of claim 3, further comprising the steps of:
   receiving said new credential store;
   retrieving a new local lockbox for said new credential store
   retrieving a lockbox for a credential store;
   selecting a new encryption key from among a list of encryption keys in said new local lockbox; and,
   decrypting said new credential store with said selected new encryption key.

6. A machine readable storage having stored thereon a computer program for credential store security, the computer program comprising a routine set of instructions which when executed by a machine cause the machine to perform the steps of:
   retrieving a local lockbox for a credential store;
   selecting an encryption key from among a list of encryption keys in said lockbox;
   decrypting said credential store with said selected encryption key;
   retrieving a global lockbox for said credential store; and,
   if said selected encryption key cannot decrypt said credential store, selecting an encryption key from said global lockbox to decrypt said credential store.

7. The machine readable storage of claim 6, further comprising an additional set of instructions which when executed by the machine causes the machine to further perform the step of replacing said local lockbox with said global lockbox and re-encrypting said credential store if said selected encryption key cannot decrypt said credential store.

8. The machine readable storage of claim 6, wherein said first attempting step comprises the steps of:
   prompting the user for a password;
   receiving said password; and,
   attempting to unlock said credential store with a key derived from said password.

9. The machine readable storage of claim 8, further comprising an additional set of instructions which when executed by the machine causes the machine to further perform the steps of:
   creating a new local lockbox;
   encrypting said new local lockbox;
   replacing a global lockbox with said new local lockbox; and,
   encrypting said credential store with said key derived from said password.

10. The machine readable storage of claim 8, further comprising an additional set of instructions which when executed by the machine causes the machine to further perform the steps of:
    receiving said new credential store;
    retrieving a new local lockbox for said new credential store
    retrieving a lockbox for a credential store;
    selecting a new encryption key from among a list of encryption keys in said new local lockbox; and,
    decrypting said new credential store with said selected new encryption key.

* * * * *